(12) United States Patent
Gurule

(10) Patent No.: US 12,134,172 B2
(45) Date of Patent: Nov. 5, 2024

(54) CLAMP DESIGNS WITH INTEGRATED FEATURES AND METHODS RELATING THERETO

(71) Applicant: James Jospeh Gurule, Danville, CA (US)

(72) Inventor: James Jospeh Gurule, Danville, CA (US)

(73) Assignee: James Jospeh Gurule, Danville, CA (US)

( * ) Notice: Subject to any disclaimer, the term of this patent is extended or adjusted under 35 U.S.C. 154(b) by 234 days.

(21) Appl. No.: 17/638,858

(22) PCT Filed: Aug. 30, 2020

(86) PCT No.: PCT/US2020/048665
§ 371 (c)(1),
(2) Date: Feb. 28, 2022

(87) PCT Pub. No.: WO2021/042010
PCT Pub. Date: Mar. 4, 2021

(65) Prior Publication Data
US 2022/0297266 A1    Sep. 22, 2022

Related U.S. Application Data

(60) Provisional application No. 62/922,803, filed on Aug. 30, 2019.

(51) Int. Cl.
*B25B 5/10* (2006.01)
*B25B 5/16* (2006.01)
*F16B 2/12* (2006.01)

(52) U.S. Cl.
CPC .............. *B25B 5/101* (2013.01); *B25B 5/16* (2013.01); *F16B 2/12* (2013.01)

(58) Field of Classification Search
None
See application file for complete search history.

(56) References Cited

U.S. PATENT DOCUMENTS 5,697,601 A * 12/1997 Gurule .................... B23B 47/28
269/104
6,220,589 B1 * 4/2001 Smith, III ............... B25B 5/145
269/156

(Continued)

FOREIGN PATENT DOCUMENTS

WO    2008005685 A1    8/2017

OTHER PUBLICATIONS

International Search Report and Written Opinion received for International PCT Application No. PCT/US2020/048665, mailed on Dec. 8, 2020, 14 Pages.

*Primary Examiner* — Tyrone V Hall, Jr.
*Assistant Examiner* — Dana Lee Poon
(74) *Attorney, Agent, or Firm* — EcoTech Law Group, P.C.

(57) ABSTRACT

Clamp designs and methods relating thereto for working on one or more of workpieces are described. An exemplar clamp design includes a unitary u-shaped frame having a bight portion flanked by multiple jaw portions, all of which are designed to secure one or more workpieces (e.g., cabinet face frame). The u-shaped frame, at any of its portions, has disposed thereon at least one work window that provides access to one or more secured workpieces. Further, one exemplar clamp design provides a work guide element rotatably coupled to the u-shaped frame, disposed adjacent to the work window, and having defined therein a guide aperture. In, one rotated, work position of the work guide, the guide aperture allows a tool to access and/or work, (Continued)

through the guide aperture and the work window, on a desired location on the workpiece.

20 Claims, 7 Drawing Sheets

(56) References Cited

U.S. PATENT DOCUMENTS

| | | | |
|---|---|---|---|
| 7,048,267 B2 * | 5/2006 | Bries | B25B 5/10 |
| | | | 269/224 |
| 8,657,272 B2 | 2/2014 | Gurule | |
| 2012/0228815 A1 * | 9/2012 | Gurule | B25B 5/003 |
| | | | 29/559 |
| 2017/0225301 A1 * | 8/2017 | Hopf | B25B 5/101 |

* cited by examiner

CLAMP DESIGNS WITH INTEGRATED FEATURES AND METHODS RELATING THERETO

RELATED APPLICATIONS

This application is a National Stage Application of PCT/US2020/48665 filed on Aug. 30, 2020, which claims priority to U.S. Provisional Application No. 62/922,803, which was filed on Aug. 30, 2019, which are incorporated herein by reference for all purpose.

FIELD

The present teachings generally relate to novel clamp designs for effectively accessing or working on desired locations on one or more workpieces and methods relating thereto. More particularly, the present teachings relate to novel clamp designs and methods relating thereto that rely upon certain integrated features for, not only securing, but accessing, aligning and/or modifying (e.g., fastening) one or more workpieces.

BACKGROUND

Assembly of multiple workpieces to build structural units (e.g., storage cabinets) or to install such structural units to existing support systems (e.g., build and/or install wall, base and tall cabinets in a kitchen, bath, garage or office), requires clamping these workpieces. Conventional clamp designs, used for clamping, implement various types of securing hardware to hold in place the multiple workpieces during the build out or installation of these units. In some instances, the conventional clamp designs include provisions for a tool to access and fasten the workpieces in their clamped or secured state.

Unfortunately, the conventional clamp designs offer no visibility into the location where the tool is accessing one or more of the workpieces during an assembly process. Consequently, the conventional clamp designs provide no guarantee that the location where the fasteners are driven into the workpieces, during assembly, will be appropriate to effectively fasten the workpieces. By way of example, the conventional clamp designs allow a fastener (e.g., a screw or a nail) to be driven at undesired locations (e.g., near an edge of a surface) on one or more of the workpieces, compromising the structural integrity of the ultimately resulting assembled workpieces.

What is, therefore, needed are novel clamp designs and methods relating thereto that ensure that tools access desired locations on the workpieces for producing assembled units that are well-aligned and, as a result, enjoy the desired structural integrity.

SUMMARY

The present arrangements and teachings offer novel clamping system designs and methods relating thereto that, respectively, provide and use certain integrated features to overcome the drawbacks associated with the conventional clamp designs. The present arrangements and teachings of the novel clamp designs ensure that high precision alignment of multiple workpieces contributes to the structural integrity of the ultimately resulting assembled products. Certain novel features of the present clamp designs allow effective visibility into desired locations on the workpiece(s), where a tool, during assembly, accesses the workpiece at the desired location to perform various functions that reduce or prevent future product failure. Further, the present clamp designs, with its novel features described below, allow rapid assembly of multiple workpieces and thereby offers high throughput assembly methods.

Present clamp designs, preferably, include a unitary u-shaped frame having a bight portion flanked by multiple jaw portions, all of which are designed to secure one or more workpieces. The u-shaped frame, at any of its portions, has disposed thereon at least one work window that provides access to one or more secured workpieces. Further, an exemplar clamp design provides a work guide element rotatably coupled to the u-shaped frame, disposed adjacent to the work window, and having defined therein a guide aperture. In, one rotated, work position of the work guide, the guide aperture allows a tool to access and/or work, through the guide aperture and the work window, on the desired location of the workpiece.

In one aspect, the present arrangements provide clamps for effecting alignment of one or more work pieces. One such exemplar present clamp arrangement includes a unitary u-shaped frame for clamping one or more workpieces and having defined therein at least one work window designed to provide access through the u-shaped frame to one or more of the workpieces. This arrangement also includes a work guide rotatably coupled to the frame, disposed adjacent to at least one of the work windows and having defined therein a guide aperture. In an operative state of the work guide, the work guide is free to rotate, relative to the u-shaped frame, to a plurality of positions. In this operative state, the guide aperture is, accordingly, free to acquire a plurality of aligned locations that align with a plurality of work window locations that are defined within at least one of the work windows. In this arrangement, each of the plurality of aligned locations corresponds to one of the work window locations. Further, in the operative state of the work guide, the plurality of aligned locations and corresponding ones of the work window locations define a plurality of pathways, each of which is capable of allowing a tool to pass through the guide aperture and the work window to access or work on a desired work location on one or more workpieces. Thus, this arrangement offers the user a plurality of pathways to reach one or more workpieces and the user is free to select the pathway that provides access to the desired work location on one or more of the workpieces.

In certain preferred embodiments, the unitary u-shaped frame used in the present arrangements is defined by a bight portion, a first jaw portion and a second jaw portion. The first jaw portion includes two parallelly extending clamping members, i.e., a first clamping member and a second clamping member. In an operative state of the u-shaped frame, the bight portion, the first clamping member and the second clamping member and the second jaw portion are disposed around one or more of the workpieces. Further, the first clamping member and the second clamping member are separated by a distance or space to define therebetween at least one work window.

Although not necessary, the present clamp designs may include: (i) a bight engagement mechanism including a bight shaft that is threaded to engage with a bight bore defined inside the bight portion of the u-shaped frame; (ii) a jaw engagement mechanism including a jaw shaft that is threaded to engage with a jaw bore defined inside a distal end of the second jaw portion; (iii) a bight pressure plate that is disposed at a distal end of the bight shaft, such that in an operative of the bight engagement mechanism, the bight pressure plate facilitates alignment of one or more of the workpieces in a back-and-forth direction; and (iv) a jaw pressure plate that is disposed at a distal end of the jaw shaft such that in an operative state of the jaw engagement mechanism, the jaw pressure plate facilitates alignment of one or more of workpieces in a side-to-side direction.

In one embodiment, the work guide employed in the present arrangements is a drill guide. In this embodiment, the guide aperture is a drill guide aperture, which is designed to receive and allow a drill to pass therethrough.

In another aspect, the present arrangements provide another type of clamp arrangements that use a reinforcement member. One such exemplar present clamp arrangement includes a unitary u-shaped frame defined by a bight portion, a first jaw portion and a second jaw portion. The first jaw portion includes, parallelly extending, a first clamping member and a second clamping member. In an operative state of the u-shaped frame, the bight portion, the first clamping member and the second clamping member and the second jaw portion are disposed around one or more workpieces. In this arrangement, a reinforcement member is coupled, at a distal end of the first jaw portion, to the first clamping member and the second clamping member. Further, a work guide having defined therein a guide aperture, is rotatably coupled to the reinforcement member such that in, a plurality of rotated, work positions of the work guide, the guide aperture acquires a plurality of operating positions that are capable of providing a tool access to work on one or more desired locations on one or more of the workpieces.

This arrangement may include a spring ball detent coupled to the reinforcement member. As such, the spring ball detent is capable of locking the work guide into a non-operational, stowed position. In one implementation of this arrangement, the reinforcement member, coupled to both and extending between the first clamping member and the second clamping member of the first jaw portion, includes a horizontal flat edge. Further, in a non-operational, stowed position of the work guide, a horizontal edge of the work guide aligns with the horizontal flat edge of the reinforcement member.

In this arrangement, the first clamping member and the second clamping member may be separated by a first jaw portion space or a first jaw portion work window. In an operational state of the work guide, the work guide is free to rotate, relative to the u-shaped frame, to a plurality of positions. In this operational state, the guide aperture is, accordingly, free to acquire a plurality of aligned locations that align with a plurality of first jaw portion space locations or the first jaw portion work window locations, which are defined within at least one of the first jaw portion space or the first jaw portion work window, respectively. In this configuration, each of the plurality of aligned locations corresponds to one of the first jaw portion space locations or first jaw portion work window locations. Further, in the operative state of the work guide, the plurality of aligned locations and corresponding ones of the first jaw portion locations define a plurality of pathways. Each of these pathways is capable of allowing a tool to pass through the guide aperture and the first jaw portion space or the first jaw portion work window to access or work on a desired work location on one or more workpieces. However, a user is free to select one pathway from a plurality of pathways to access the desired work location on one or more of the workpieces.

In one embodiment of the present arrangements, the first jaw portion space or the first jaw portion work window extends from or near a first proximate end, where the first jaw portion intersects the bight portion, to a location adjacent to the reinforcement member. In an alternate embodiment of the present arrangements, the first jaw portion space or the first jaw portion work window, is not so confined and, extends from the first jaw portion to the bight portion.

In certain preferred embodiments, the work guide of the present arrangement is a drill guide that is capable of rotating from the non-operational, stowed position to an operational, drilling position. The drilling position may be the one rotated, work position that defines a pathway for a drill to pass through the guide aperture and the first jaw portion space or the first jaw portion work window to drill into one or more workpieces.

The present arrangements reflect an understanding that the work guide may be detachably coupled to the reinforcement member. In this arrangement, a first work guide is capable of detaching and being replaced with a second work guide, which is different from the first work guide. The second work guide has defined thereon a second guide aperture, which is different from the first guide aperture. Further, in the one rotated, work position of the second work guide, the same or a different tool passes through the second guide aperture and the first jaw portion space to access or work on one or more work pieces. In this arrangement, tools or objects of different types and/or dimensions may access, using complementary types and/or dimensions of work guides, one or more workpieces.

Like the first jaw portion, the second jaw portion may include a third clamping member parallelly extending with a fourth clamping member. At or near a second proximate end, where the second jaw portion intersects the bight portion, the third clamp member and the fourth claim member may be separated by a distance or a space to define a second jaw portion distance or a second jaw portion working window. Similar to one of the configurations described in connection with the first jaw portion, in this configuration of the second jaw portion, the second jaw portion distance or the second jaw portion working window is sufficiently large to provide, during an operational state of the u-shaped frame, a line of sight to and/or allow work to be carried out on one or more of the workpieces. By way of example, a user may use the second jaw portion distance, or the second jaw portion working window to touch and thereby align one or more workpieces, which are visible through the second jaw portion distance or the second jaw portion working window. The conventional clamp designs do not offer such significant advantages offered by the present clamp arrangements.

Moreover, in this aspect, the clamp arrangement may further include a supporting member disposed at or near the second proximate end, where the second jaw portion and bight portion intersect. The support member serves to connect the third clamping member and the fourth clamping member to provide mechanical support to the u-shaped frame at or near a corner region of the second proximate end.

In one embodiment of the present arrangements, the third clamping member and the fourth clamping member parallelly extend from the bight portion to the second jaw portion and are arranged to define therebetween an extending space or an extending work window that extends from the bight portion to the second jaw portion. In this configuration and in an operational state of the u-shaped frame, a sufficiently large opening is defined in the u-shaped frame to facilitate alignment of one or more of the multiple work pieces surrounded by the u-shaped frame.

In one embodiment, the extending space or the extending work window, used in the present arrangements, does not extend into a center region of the bight portion that is at or near location of the bight bore. The present teachings recognize that a requisite amount of clamp material should be present at load bearing regions of the u-shaped frame to effectively clamp one or more workpieces. The present teachings also recognize that albeit an empty space created by the presence of the extending space or the extending work window is desirable as it provides visibility into one or more clamped workpieces for effecting alignment, for example, but empty space extending to or near load bearing regions of the u-shaped frame may compromise the structural integrity of the present clamp arrangements.

In certain preferred embodiments, the above-mentioned exemplar clamp design (that uses a reinforcement member) includes: (i) a bight engagement mechanism including a bight shaft that is threaded to engage with a bight bore defined inside the bight portion of the u-shaped frame; (ii) a jaw engagement mechanism including a jaw shaft that is threaded to engage with a jaw bore defined inside a distal end of the second jaw portion; (iii) a bight pressure plate that is disposed at a distal end of the bight shaft, such that in an operative of the bight engagement mechanism, the bight pressure plate facilitates alignment of one or more of the workpieces in a back-and-forth direction; and (iv) a jaw pressure plate that is disposed at a distal end of the jaw shaft such that in an operative state of the jaw engagement mechanism, the jaw pressure plate facilitates alignment of one or more of workpieces in a side-to-side direction.

This exemplar clamp design may include an in-turned projection disposed at a first distal end of the first jaw portion and, preferably, at one end of the reinforcement member. The jaw pressure plate may be L-shaped, and in the operative state of the jaw engagement mechanism, the L-shaped jaw pressure plate functions in conjunction with the in-turned projections, a contacting interior surface of the first jaw portion and the bight pressure plate to align the multiple workpieces in the back-and-forth direction (x-direction) and side-to-side direction (y-direction). In this configuration, the contacting interior surface of the first jaw portion is designed to contact, during the operative state of the jaw engagement mechanism, at least one surface of the workpiece. In this embodiment, the second jaw portion of the present arrangements, at a second distal end, may not include an in-turned projection and the L-shaped jaw pressure plate is a different component from the second jaw portion.

At least one of the bight engagement mechanism and the jaw engagement mechanism optionally include a T-shaped handle disposed at a terminating end of the bight engagement shaft and/or the jaw engagement shaft.

In preferred embodiments of the present clamp arrangements, the first jaw portion of the present clamp arrangements do not have defined therein a jaw bore similar to the one defined in the second jaw portion. In these embodiments, the first jaw portion does not have disposed thereon a jaw engagement mechanism similar to the one disposed on the second jaw engagement mechanism. At a central region of the bight portion, no work window is, preferably, disposed to interfere with the mechanical strength of the u-shaped frame around the bight bore. The unitary u-shaped frame is, preferably, a single piece and not made from multiple components. In the operative state, the u-shaped frame surrounds, preferably, a stile portion of one or more workpieces and does not surround corners portions of adjacent workpieces.

In yet another aspect, the present teachings provide methods for working on one or more of workpieces. One such exemplar method begins by obtaining a clamp including a u-shaped frame having defined therein a work window. The u-shaped frame has installed thereon a swiveling work guide that is disposed adjacent to the work window. The swiveling work guide has defined therein a guide aperture. The exemplar method then proceeds to securing, using the clamp, one or more workpieces, such that the u-shaped frame secures at least some surfaces of one or more of the multiple work pieces, to form one or more of the secured workpieces. Once secured, the exemplar method then advances to swiveling the work guide into a desired position such that the guide aperture aligns with the work window and a desired work location, on one or more of the secured workpieces, where work is to be performed. In other words, the guide aperture and the work window align to form a pathway to the desired location on one or more of the secured workpieces. The exemplar method, next, includes passing, in the desired position, a portion of a tool and/or an object through the guide aperture and the work window to access the desired work location on one or more of the secured workpieces.

The exemplar method, preferably, further includes commencing work on the desired work location on one or more of the secured workpieces. By way of example, the step of commencing and/or the step of passing includes using a line of sight through the work window to reach the desired work location on one or more of the workpieces.

In preferred embodiments of the exemplar method, the step of obtaining includes obtaining the u-shaped frame defined by a bight portion, a first jaw portion and a second jaw portion, wherein the first jaw portion includes, parallelly extending, a first clamping member and a second clamping member that are separated by the work window that is disposed adjacent to the swiveling work guide. The step of securing may include securing one or more work pieces using the u-shaped frame, such that the bight portion, the first clamping member and the second clamping member and the second jaw portion are disposed around one or more of the workpieces. Preferably, the securing step is carried out using a bight engagement mechanism and a jaw engagement mechanism, wherein the bight engagement mechanism aligns the multiple workpieces in a back-and-forth direction and the jaw engagement mechanism aligns the multiple workpieces in a side-to-side direction.

The exemplar method, preferably, further includes a step of aligning one or more of the secured workpieces, wherein the aligning is carried out prior to the step of swiveling the work guide. The aligning step may include touching one or more of the secured workpieces using a second jaw portion work window that is defined on the second jaw portion and is disposed adjacent to the jaw engagement mechanism. Additionally, or alternately, the aligning step may include touching one or more of the secured workpieces using the work window adjacent to the work guide. The present teachings recognize that the steps of securing and aligning may be carried out substantially contemporaneously.

The step of swiveling the work guide into the operating position may include displacing a lever, integrated with or coupled to the work guide, from a non-operating position of the work guide to the operating position of the work guide. The lever is an optional feature of the present arrangements and the present teachings contemplate other means for swiveling the work guide.

The step of passing may include passing a portion of a drill and/or a fastener through a drilling aperture, defined in the drill guide, and through the work window for working on and/or fastening at the desired work location on one or more of the secured workpieces. In one embodiment, the passing step, described in connection with the exemplar method, is carried out using a line of sight, through the work window, to the desired work location, on one or more of the workpieces, where drilling is to occur.

Preferably, in the swiveling step, the work guide is free to rotate, relative to the u-shaped frame, to a plurality of positions. In this step, accordingly, the guide aperture is free to acquire a plurality of aligned locations that align with a plurality of work window locations defined within at least one of the work windows. Further, each of the plurality of aligned locations corresponds to one of the work window locations. In this configuration, the plurality of aligned locations and corresponding ones of the work window locations define a plurality of pathways, each of which allows a tool and/or an object to pass through the guide aperture and the work window to access or work on a desired work location on one or more workpieces. In this context, the swiveling step may include selecting one of the plurality of positions of the work guide that defines a desired pathway through one of the aligned locations of the guide aperture and one of the work window locations of the work window to provide access to the desired work location on one or more workpieces.

The construction and method of operation of the present arrangement and present teachings, however, together with additional objects and advantages thereof, will be best understood from the following descriptions of specific embodiments when read in connection with the accompanying figures that described below.

DETAILED DESCRIPTION OF THE PREFERRED EMBODIMENTS

In the following description, numerous specific details are set forth in order to provide a thorough understanding of the present invention. It will be apparent, however, to one skilled in the art that the present invention may be practiced without limitation to some or all of these specific details. By way of example, although various examples and embodiments describe systems and methods for assembling multiple work pieces, but using the novel features of the present arrangements, a single workpiece may be worked upon by one or more of different types of tools. In other instances, well-known process steps have not been described in detail in order to not unnecessarily obscure the invention.

Figure 1A:
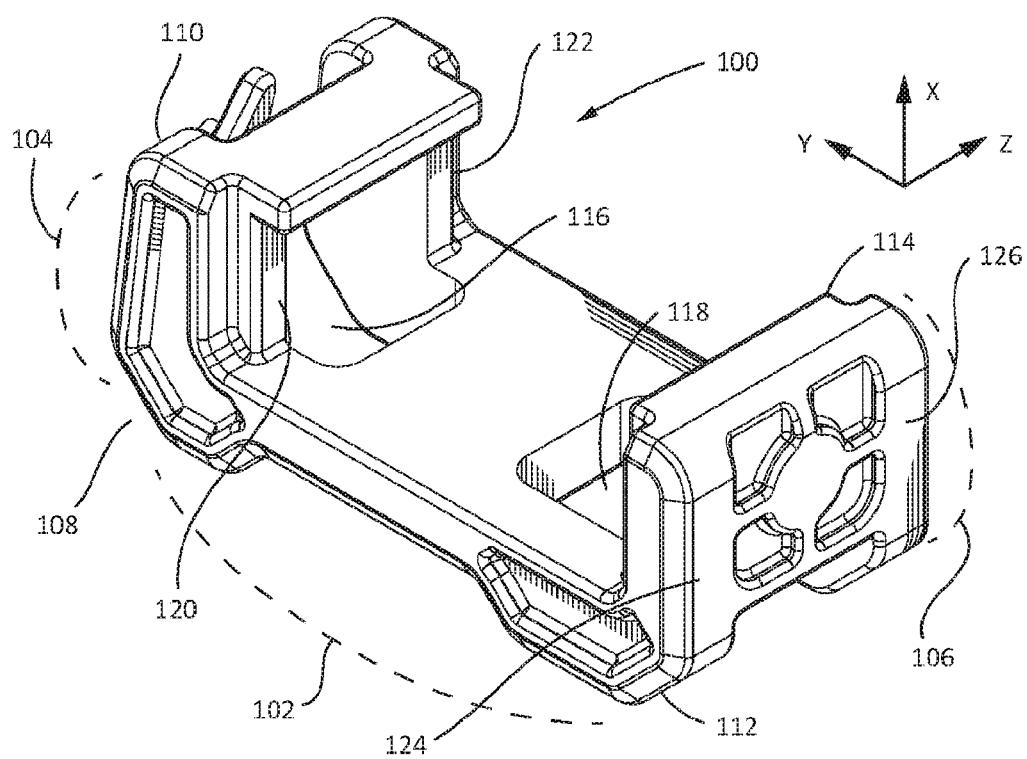
FIG. 1A shows a perspective view of a unitary u-shaped frame, according to one embodiment of the present arrangements, that is integrated into the present clamp designs.

FIG. 1A shows a u-shaped frame 100, according to one embodiment of the present arrangements, that includes a bight portion 102 that is flanked by a first jaw portion 104 and a second jaw portion 106. On u-shaped frame 100, a first proximate end 108 refers to a region where bight portion 102 and first jaw portion 104 intersect. Accordingly, a region where bight portion 102 and second jaw portion 106 intersects is defined by a second proximate end 112. Further, on first jaw portion 104, a first distal end 110 is opposite to first proximate end 108 and on second jaw portion 106, a second distal end 114 is opposite to second proximate end 112. These various portions and ends of u-shaped frame 100 not only describe the location of various novel features of the present arrangements, but also underscore why such novel features are uniquely placed in the u-shaped frame to offer advantages not found in conventional clamp designs.

By way of example, u-shaped frame 100 of the present arrangements includes one or more strategically placed work windows. In operational states of the present arrangements with respect to one or more work pieces, work windows provide a user with a line of sight into the workpiece and allows the user to touch and move one or more workpieces to accomplish effective alignment. In certain embodiments of the present arrangements, first jaw portion 104 has defined thereon a first jaw portion work window 116 and/or second jaw portion 106 has defined thereon a second jaw portion work window 118. It is not necessary, but formation of any one or both of first jaw portion work window 116 and second jaw portion work window 118 may be confined to first jaw portion 104 and second jaw portion 106, respectively. In contrast, depending on the application for which the present arrangements are used, any one of both of first jaw portion work window 116 and second jaw portion work window 118 may not be so confined, and extend into bight portion 102. Thus, the present arrangements do not confine work windows, described herein, to any specific dimension and may be of a suitable size that serves to effect precise alignment of and/or allow a tool to access one or more workpieces.

Work windows (e.g., first jaw portion work window 116 or second jaw portion work window 118) may be formed by defining a space in a jaw portion (e.g., first jaw portion 104 or a second jaw portion 106) and/or bight portion 102. In preferred embodiments of the present arrangements, however, these work windows are defined using a space created between two parallelly extending clamping members.

As shown in FIG. 1A, first jaw portion 104 includes a first clamping member 120 and a second clamping member 122 that parallelly extend and define a space therebetween that serves as first jaw portion work window 116. If the space separating first clamping member 120 and a second clamping member 122 extends into bight portion 102, then the resulting first jaw portion work window 116 may, but does not necessarily, extend into bight portion 102.

Similarly, second jaw portion 106 includes a third clamping member 124 (substantially similar to third clamping member 324 of FIG. 2B) and a fourth clamping member 126 (substantially similar to fourth clamping member 326 of FIG. 2B) that parallelly extend and define a space therebetween that serves as second jaw portion work window 118. If the space separating third clamping member 124 and a fourth clamping member 126 extends into bight portion 102, then the resulting second jaw portion work window 118 may, but does not necessarily, extend into bight portion 102.

Although integration of clamping members into present clamp arrangements represents preferred embodiments as they provide useful work windows for providing visibility into the workpiece(s) undergoing modification, the present teachings recognize the need to strike a balance between placement of work windows (i.e., by way of defining an empty space within a jaw portion) and having present a requisite amount of clamping material in a jaw portion to provide the much needed mechanical support during a clamping operation. As is explained, in connection with FIGS. 1A, 1B, 2A, 2B, 3A, 3B and 4 that the present arrangements integrate a reinforcement member and/or a support member at strategic locations on u-shaped frame 100 to provide this requisite mechanical support needed during clamping of multiple workpieces.

Figure 1B:
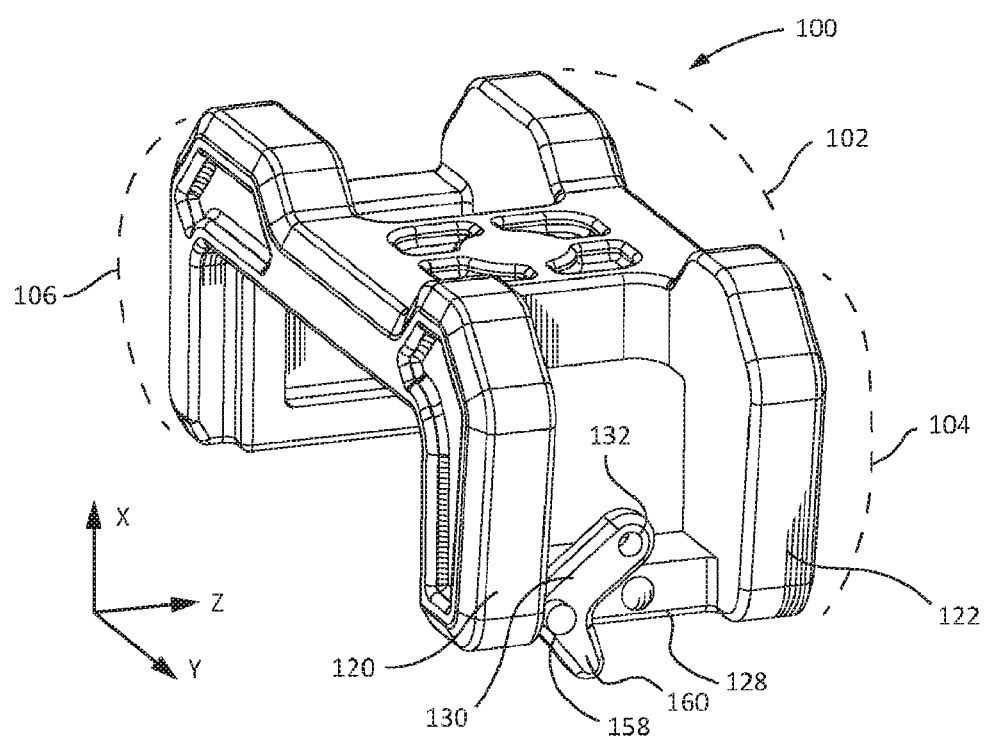
FIG. 1B shows another perspective view of a u-shaped frame that is substantially similar to the one shown in FIG. 1A that presents a reinforcement member having disposed thereon a work guide, which allows a tool to access one or more secured workpieces.

To this end, FIG. 1B shows a reinforcement member 128, disposed at first distal end 110 associated with first jaw portion 104. FIG. 1B shows with greater clarity a side view of first jaw portion 104.

According to FIG. 1B, reinforcement member 128 has installed thereon, using an angularly rotatable pin connection 158, a work guide 130. In this installed configuration, work guide 130 is capable of swiveling, about pin connection 158, on reinforcement member 128. Further, work guide 130 has defined thereon a guide aperture 132 that allows access to one or more of the workpiece(s) to carry out work (e.g., drilling) on them.

In certain preferred embodiments of the present arrangements, reinforcement member 128 includes a horizontal edge such that, in a non-operational position of the present arrangements, work guide 130 is secured in a stowed away position and a horizontal edge of the work guide aligns with the horizontal edge of the reinforcement member. In contrast, in one operational position of the present arrangements, work guide 130 displaces away from a stowed away position and moves out of alignment with the horizontal edge of the reinforcement member. In this operational position, guide aperture 132 aligns with first jaw portion work window 116 to define a pathway to access one or more workpieces, which are secured within u-shaped frame 100. One or more workpieces are secured by u-shaped frame 100, at least in part, by the presence of in-turn projections 368 (as shown in FIGS. 2A and 2B) defined at a terminating end of reinforcement member 128.

Figure 2A:
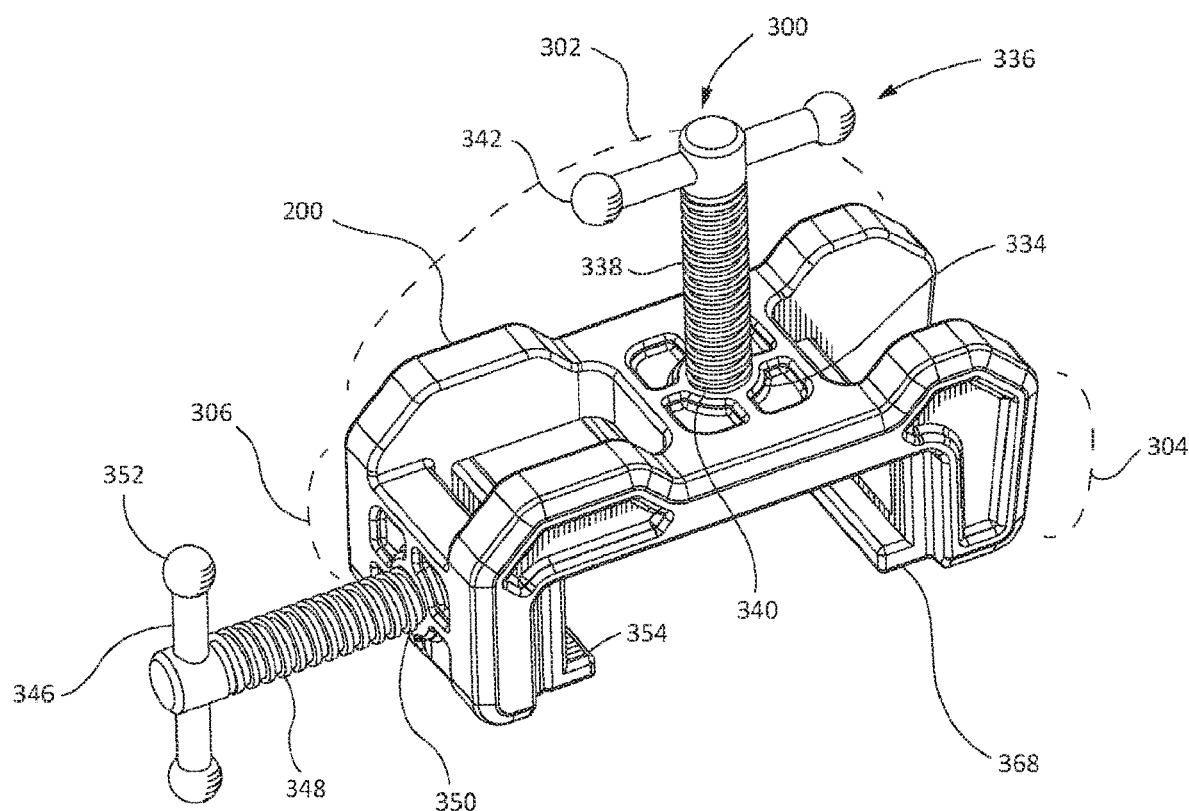
FIG. 2A shows a top perspective view of a present clamp arrangement, according to one embodiment of the present arrangements and that integrates a u-shaped frame substantially similar to the one shown in FIGS. 1A and 1B.
Figure 2B:
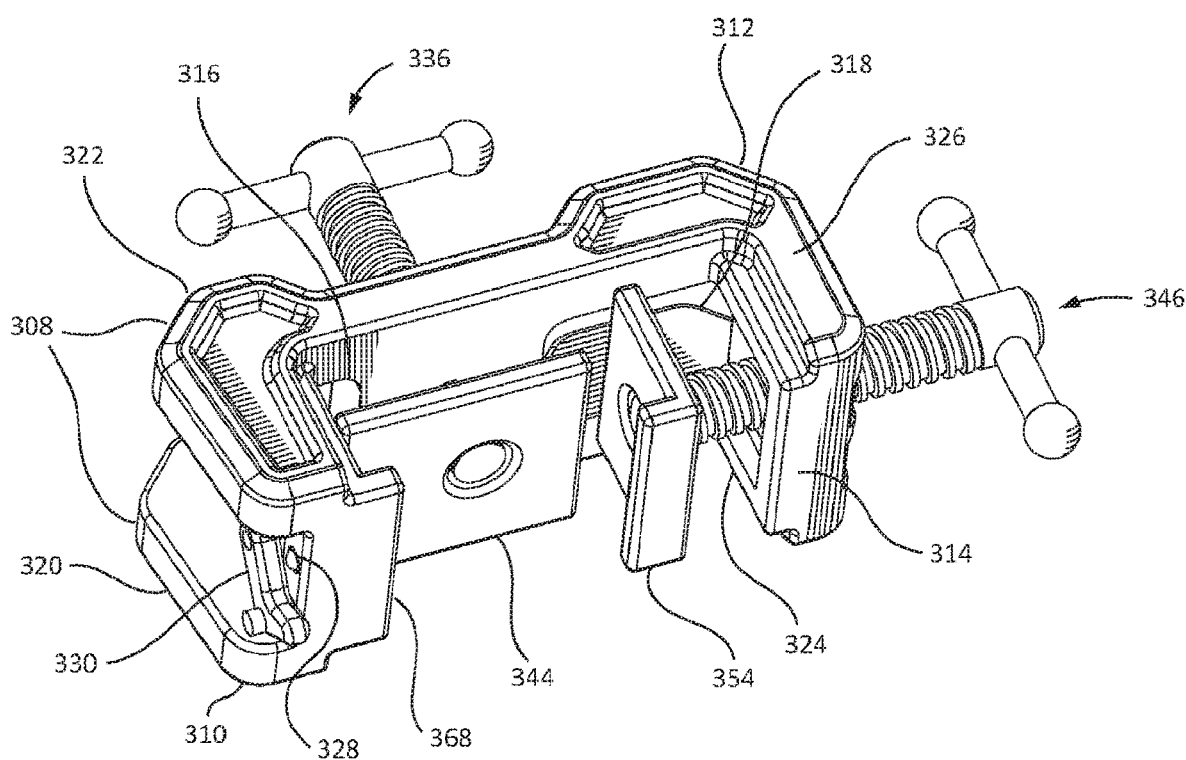
FIG. 2B shows a bottom perspective view of the present clamp arrangement shown in FIG. 2A.

FIG. 2A shows salient features integrated into a present clamp arrangement 300 and that are involved in securing one or more workpieces, for example, during an assembly operation of multiple workpieces. Clamp arrangement 300 includes a u-shaped frame 200 that has disposed thereon a bight engagement mechanism 336 and a jaw engagement mechanism 346. U-shaped frame 200 is substantially similar to u-shaped frame 100 shown in FIGS. 1A and 1B. By way of example, a bight portion 102, a first jaw portion 104, a second jaw portion 106, a first proximate end 108, a first distal end 110, a second proximate end 112, a second distal end 114, a first work window 116, a second work window 118, a first clamping member 120 and a second clamping member 122 are substantially similar to their counterparts, i.e., a bight portion 302, a first jaw portion 304, a second jaw portion 306, a first proximate end 308, a first distal end 310, a second proximate end 312, a second distal end 314, a first work window 316, a second work window 318, a first clamping member 320 and a second clamping member 322, shown in FIG. 2A or 2B. FIGS. 2A and 2B show that bight engagement mechanism 336 is provided at a central region 334 of bight portion 302 and jaw engagement mechanism 346 is provided at second distal end 314 associated with second jaw portion 306.

Bight engagement mechanism 336 includes a bight shaft 338 that is threaded and engages with a threaded bight bore 340 defined at central region 334. At a terminating end of bight shaft 338, a T-shaped bight handle 342 is provided. In one operating state of clamp arrangement 300, when one or more workpieces are surrounded or secured by u-shaped frame 300, T-shaped bight handle 342 is rotated about a longitudinal axis extending through bight shaft 338, and, in turn, bight shaft 338 coupled thereto also rotates, and a larger portion of bight shaft 338 increasingly engages with bight bore 340. This rotation motion of bight shaft 338 through bight bore 340 displaces a bight pressure plate 344 (as shown in FIG. 2B) away from bight portion 302 (shown in FIG. 2A) and towards one or more workpieces. In this operational state, one or more workpieces sandwiched between bight pressure plate 344 (of FIG. 2B) and in-turn projections 368 (associated with reinforcement member 328) undergo back-and-forth alignment (i.e., alignment in the x-direction). The more bight shaft 338 engages through bight bore 340 and, in turn, displaces more of bight pressure plate 344, one or more workpieces are sandwiched, under higher pressures, between bight pressure plate 344 and in-turn projections 368.

Jaw engagement mechanism 346 includes a jaw shaft 348 that is threaded and engages with a threaded jaw bore 350 defined at second distal end 314 associated with second jaw portion 306. At a terminating end of jaw shaft 348, a T-shaped jaw handle 352 is provided. In another operating state of clamp arrangement 300, when one or more workpieces are surrounded or secured by u-shaped frame 300, T-shaped jaw handle 352 is rotated about a longitudinal axis extending through jaw shaft 348, and, in turn, jaw shaft 348 coupled thereto also rotates and a larger portion of jaw shaft 348 increasingly engages with jaw bore 350. This rotation motion of jaw shaft 348 through jaw bore 350 displaces a jaw pressure plate 354 away from second jaw portion 306 and towards one or more workpieces. In preferred embodiments of the present arrangements, jaw pressure plate 354 is L-shaped. In an operational state of these preferred embodiments, one or more workpieces sandwiched between L-shaped jaw pressure plate 354 and a contacting interior surface of first jaw portion 304 undergo side-to-side alignment (i.e., alignment in the y-direction). The more jaw shaft 348 engages through jaw bore 350 and, in turn, displaces more of L-shaped jaw pressure plate 354, one or more workpieces are sandwiched, under higher pressures, between L-shaped jaw pressure plate 354 and contacting interior surface of first jaw portion 304.

In certain preferred embodiments, at least one of bight shaft 338 or jaw shaft 348 includes an ACME screw (0.625 diameter), which is commercially available from a hardware store. A T-shaped handle, either used in connection with bight engagement mechanism 336 or jaw engagement mechanism 346, is not a necessary element of present clamp arrangements, and any feature (i.e., sliding pin handle or a sliding pin handle that incorporates certain features of a pivot handle) may be used to rotationally displace bight shaft 338 through bight bore 340 and/or displace jaw shaft 348 through jaw bore 350. Further, the present teachings recognize that in certain operative states of the present clamp arrangements, bight pressure plate 344, L-shaped jaw pressure plate 354, in-turn projections 368 (associated with reinforcement member 328), the contacting interior surface of u-shaped frame 200 at first jaw portion 304 contribute to complete alignment of multiple work pieces, i.e., in the back-and-forth direction (x-direction) and in the side-to-side direction (y-direction). As will be explained later, with the present clamp arrangements in their completely aligned state, are now well-positioned to undergo work (e.g., fastening using a drill).

Figure 3A:
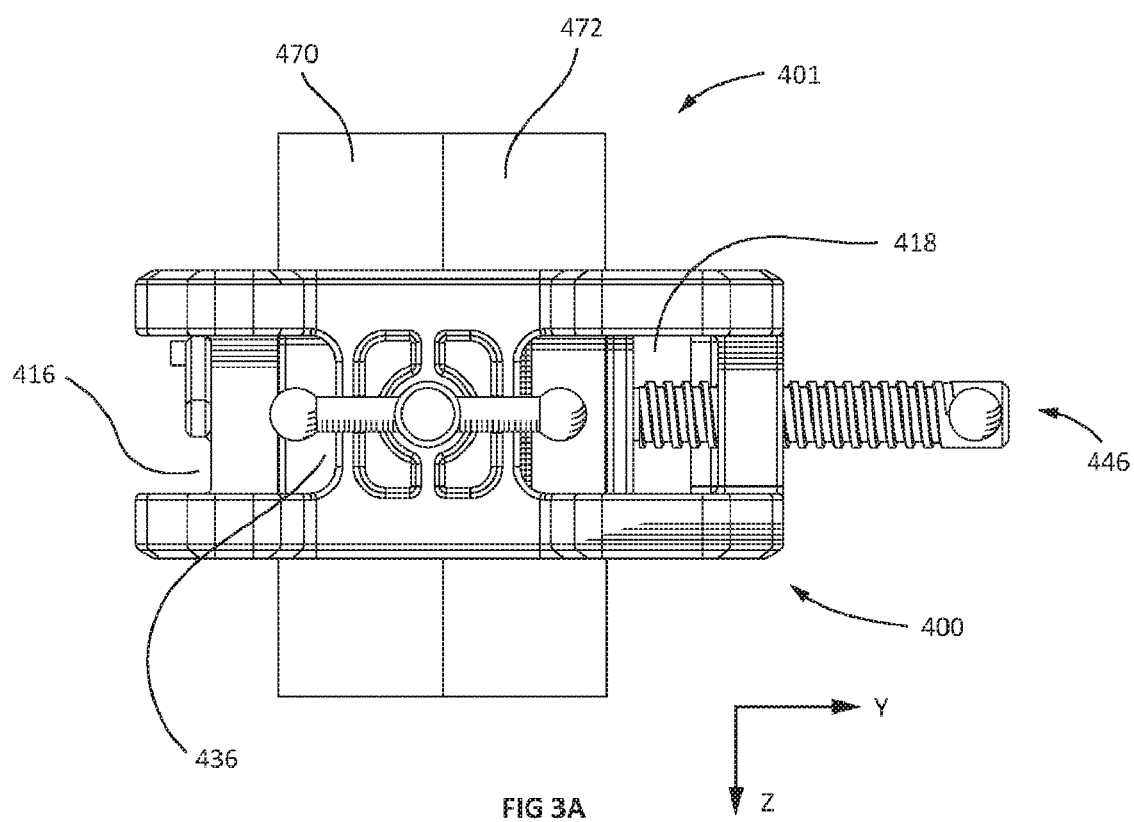
FIG. 3A shows top view of a clamped and aligned arrangement, according to one embodiment of the present arrangements, using a present clamp arrangement substantially similar to the one shown in FIGS. 2A and 2B for clamping and aligning two workpieces.

FIG. 3A shows a clamped and aligned arrangement 401, according to one embodiment of the present arrangements. In this arrangement, a present clamp arrangement 400 is used to secure therewithin two workpieces, i.e., a first workpiece 470 and a second workpiece 472. Present clamp arrangement 400 shown in FIG. 3A is substantially similar to clamp arrangement 300 shown in FIGS. 2A and 2B. Jaw engagement mechanism 446, bight engagement mechanism 436, first jaw portion work window 416 and second jaw portion work window 418 shown in FIG. 3A are identical to their counterparts, i.e., jaw engagement mechanism 346, bight engagement mechanism 336, first jaw portion work window 316 and second jaw portion work window 318 shown in FIGS. 2A and 2B. In the operational states of the present clamp arrangements described herein, the u-shaped frame, preferably, surrounds a stile portion of one or more workpieces, and does not surround corner portions of adjacent workpieces.

In clamped and aligned arrangement 401, workpieces are held in place by using jaw engagement mechanism 446 and bight engagement mechanism 436. using work windows 416 and 418, a user touches workpieces 470 and 472 and facilitates alignment in both back-and-forth direction (x-direction) and side-to-side direction (y-direction). To this end, jaw engagement mechanism 446 and bight engagement mechanism 436 also facilitate alignment in both back-and-forth direction (x-direction) and side-to-side direction (y-direction). In this aligned configuration, a bight pressure plate associated with bight engagement mechanism 436, L-shaped jaw pressure plate associated with jaw engagement mechanism 446, and in-turn projections (similar to in-turn projections 368 shown in FIGS. 2A and 2B) disposed at distal ends of first jaw portion (similar to first jaw portion 304 of FIG. 2A) apply pressure and ensure alignment in the back-and-forth direction (x-direction). For alignment in the side-to-side direction (y-direction), a contacting interior surface of the first jaw portion and the L-shaped jaw pressure plate play an integral role. Each of these elements, i.e., a bight pressure plate associated with bight engagement mechanism 436, L-shaped jaw pressure plate associated with jaw engagement mechanism 446, in-turn projections (similar to in-turn projections 368 shown in FIGS. 2A and 2B), and the contacting interior surface of the first jaw portion, collectively contribute to effecting complete alignment (i.e., in the back-and-forth direction (x-direction) and in the side-to-side direction (y-direction)) of workpieces 470 and 472.

Figure 3B:
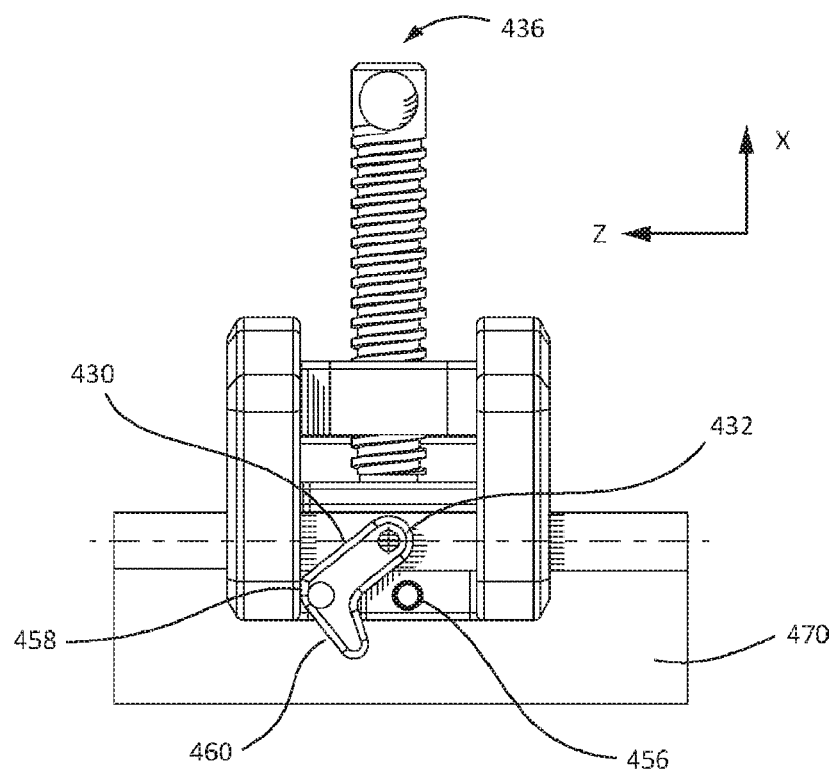
FIG. 3B shows a side view of the clamped and aligned arrangement of FIG. 3A.

FIG. 3B shows a sideview of clamped and aligned arrangement 401 and in this orientation, one surface of workpiece 470 secured adjacent to the first jaw portion is clearly visible. Work guide 430, guide aperture 432, pin connection 458 and lever 460 are substantially similar to their counterparts, i.e., work guide 330 shown in FIG. 2B and guide aperture 132, pin connection 158 and lever 160 shown in FIG. 1B. A spring ball detent 456 is coupled to (e.g., installed on) a reinforcement member (which is similar to reinforcement member 128 shown in FIG. 1B) that extends between the first clamping member and the second clamping member of the first jaw portion. The reinforcement member, preferably, includes a horizontal flat edge and in a non-operational, stowed position of work guide 430, a horizontal edge of work guide 430 aligns with the horizontal flat edge of the reinforcement member. Further, spring ball detent 456 functions to lock work guide 430 into this non-operational, stowed position.

However, when the work guide 430 is operational and out of the stowed position, the work guide is free to rotate, relative to said u-shaped frame. In fact, work guide 430 is free to displace to a plurality of positions adjacent to first jaw portion work window 416. In this operative state, guide aperture 432 is, accordingly, free to acquire a plurality of aligned locations that align with a plurality of work window locations, which are defined within at least one of first jaw portion work window 416. Each of the plurality of aligned locations corresponds to one of the work window locations. Therefore, in this operative state of work guide 430, the plurality of aligned locations and corresponding ones of the work window locations define a plurality of pathways. Each of these pathways is capable of allowing a tool to pass through guide aperture 432 and first jaw portion work window 416 to access or work on a desired location on one or more workpieces.

Before performing work on one or more workpieces, a user, preferably, identifies the desired work location, using a line of sight through first jaw portion work window 416, on one or more workpieces. In this manner, the present arrangements ensure that the proper location on a workpiece is being worked upon and overcomes the drawbacks encountered by the conventional clamp designs. Specifically, the present clamp arrangements prevent a fastener (e.g., a screw or a nail) to be driven at undesired locations (e.g., near an edge of a surface) on one or more of the workpieces. As a result, the present clamp arrangements do not suffer from the drawbacks of compromised structural integrity of the ultimately resulting assembled workpieces that result from frequent use of conventional clamp designs.

Figure 4:
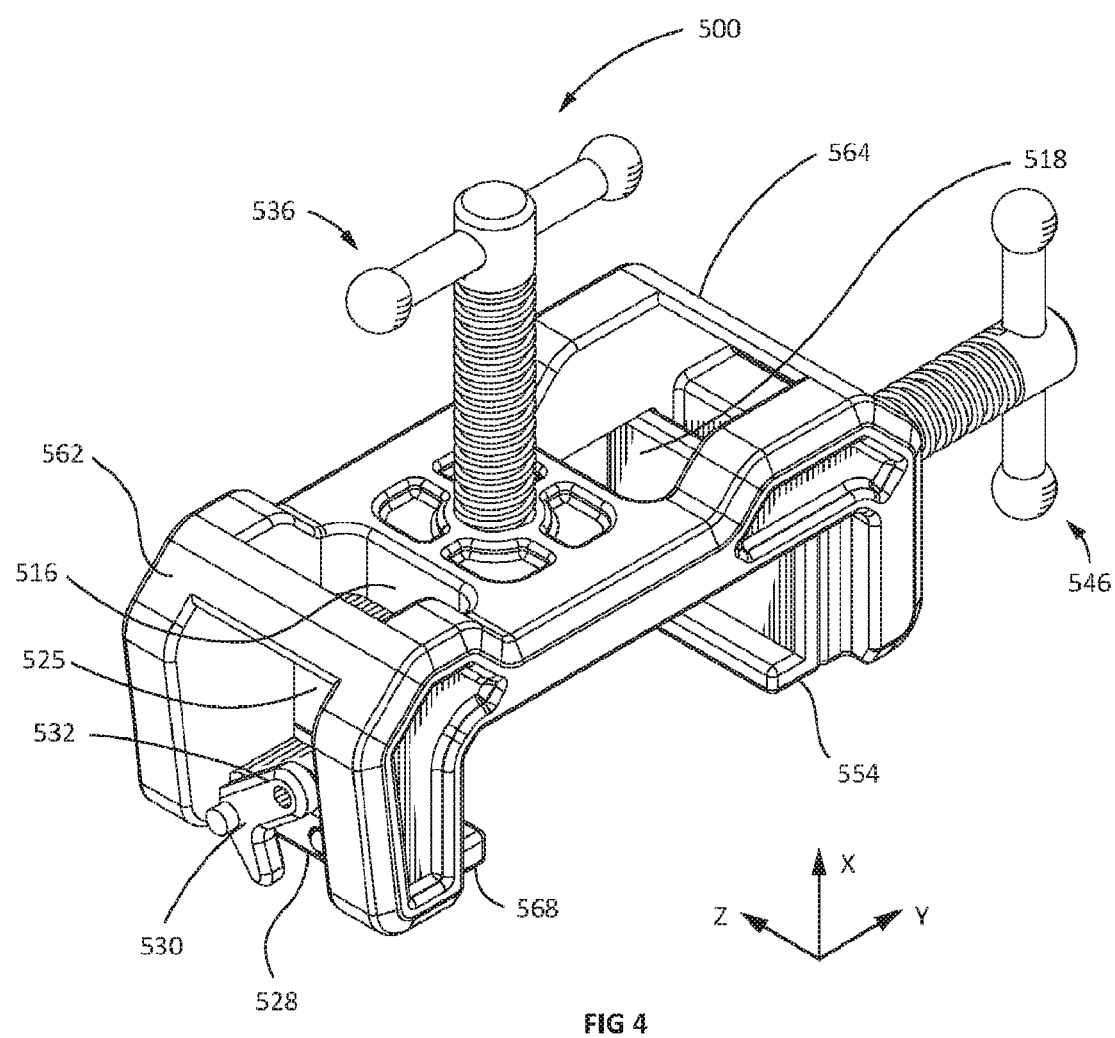
FIG. 4 shows a top perspective view of a present clamp arrangement, according to an alternate embodiment of the present arrangements and that integrates support members at the corners of a u-shaped frame that is substantially similar to the ones shown in FIGS. 1A and 1B.

FIG. 4 shows a present clamp arrangement 500, according to an alternate embodiment of the present arrangements. Present clamp arrangement 500 includes a jaw engagement mechanism 546, a bight engagement mechanism 536, a first jaw portion work window 516, a second jaw portion work window 518, a reinforcement member 528, a work guide 530, a guide aperture 532, an in-turn projection 568 and an L-shaped jaw pressure plate 554, which are substantially similar to their counterparts, i.e., jaw engagement mechanism 346, bight engagement mechanism 336, first jaw portion work window 416, second jaw portion work window 418, reinforcement member 328, work guide 430, a guide aperture 432, an in-turn projection 368 and an L-shaped jaw pressure plate 354, all of which are shown in FIGS. 2A, 2B, 3A and 3B. Further, present claim arrangement 500, in certain preferred embodiments, includes the same u-shaped frame as present clamp arrangement 300.

As shown in the alternate embodiment of FIG. 4, a first support member 562 is disposed at or near an intersection of the first jaw portion and the bight portion and a second support member 564 is disposed at or near an intersection of the second jaw portion and the bight portion. In other words, in present clamp arrangement 500 one or more support members (e.g., one or more of support members 562 and 564) are provided at corners of the u-shaped frame to provide the requisite mechanical strength for high load bearing applications and the like. In this configuration, work window that may have extended from a jaw portion to the bight portion has its mechanical strength fortified by the presence of support members. This creates a lower first jaw portion work window 525 and an upper first jaw portion work window 516 on one side of present clamp arrangement 500. Similarly, on other side of present clamp arrangement, a lower second jaw portion work window (not labelled to simplify illustration) and an upper second jaw portion work window 518 are formed. In this manner, visibility to one or more workpieces are maintained, without compromising the requisite mechanical strength at the corners of the u-shaped frame. In fact, the present teachings recognize a need for novel clamp arrangements, such as present clamp arrangement 500, that use support members to overcome any mechanical failures suffered during large load bearing clamping applications.

The present teachings also offer methods of working (e.g., fastening to assemble) on one or more workpieces. One such exemplar method begins by obtaining a clamp (e.g., present clamp arrangements 300 or 500 shown in FIGS. 2A and 4, respectively) including a u-shaped frame (e.g., u-shaped frame 100 shown in FIGS. 1A, 1B) having defined therein a work window (e.g., first jaw portion work window 116 and second jaw portion work window 118 of FIG. 1A). The u-shaped frame has installed thereon a swiveling work guide (e.g., work guide 130 of FIG. 1B) that is disposed adjacent to the work window. The swiveling work guide has defined therein a guide aperture (e.g., guide aperture 132 of FIG. 1B).

Next, the exemplar method proceeds to securing, using the clamp, one or more workpieces (e.g., workpieces 470 and 472 shown in FIGS. 3A and 3B), such that the u-shaped frame secures at least some surfaces of one or more of the multiple work pieces, to form one or more of the secured workpieces.

Once secured, the exemplar method then advances to swiveling the work guide (e.g., using pin connection 158 of FIG. 1B) into a desired position such that the guide aperture aligns with the work window and a desired work location, on one or more of the secured workpieces. In other words, the guide aperture and the work window align to form a pathway to the desired location on one or more of the secured workpieces.

The exemplar method, next, includes passing, in the desired position, a portion of a tool (e.g., drill) and/or an object (e.g., fastener, such as a screw) through the guide aperture and the work window to access the desired work location on one or more of the secured workpieces.

The exemplar method, preferably, further includes commencing work on the desired work location on one or more of the secured workpieces. By way of example, the step of commencing and/or the step of passing includes using a line of sight through the work window (e.g., first jaw portion work window 116 of FIG. 1A) to reach the desired work location on one or more of the workpieces.

In preferred embodiments of the exemplar method, the step of obtaining includes obtaining the u-shaped frame (e.g., u-shaped frame 100 shown in FIGS. 1A and 1B) defined by a bight portion, a first jaw portion and a second jaw portion. The first jaw portion includes, parallelly extending, a first clamping member and a second clamping member that are separated by the work window that is disposed adjacent to the swiveling work guide. In this embodiment where a u-shaped frame is used, the step of securing includes disposing the bight portion, the first clamping member and the second clamping member and the second jaw portion around one or more of the workpieces. Preferably, the securing step is carried out using a bight engagement mechanism and a jaw engagement mechanism, wherein the bight engagement mechanism aligns the multiple workpieces in a back-and-forth direction and the jaw engagement mechanism aligns the multiple workpieces in a side-to-side direction.

The exemplar method, preferably, further includes a step of aligning one or more of the secured workpieces, wherein the aligning is carried out prior to the step of swiveling the work guide. The aligning step may include touching one or more of the secured workpieces using a second jaw portion work window (e.g., second jaw portion work window 318 of FIG. 2B) that is defined on the second jaw portion (e.g., second jaw portion 306 of FIG. 2A) and is disposed adjacent to the jaw engagement mechanism (e.g., jaw engagement mechanism 346 of FIGS. 2A and 2B). Additionally, or alternately, the aligning step may include touching one or more of the secured workpieces using the work window (e.g., first jaw portion work window 316 of FIG. 2B) adjacent to the work guide (e.g., work guide 330 of FIG. 2B). The present teachings recognize that the steps of securing and aligning may be carried out substantially contemporaneously.

The step of swiveling the work guide into the operating position may include displacing a lever (e.g., lever 460 of FIG. 3B), integrated with or coupled to the work guide, from a non-operating position of the work guide to an operating position of the work guide. The lever is an optional feature of the present arrangements and the present teachings contemplate other means for swiveling the work guide.

The step of passing may include passing a portion of a drill and/or a fastener through a drilling aperture, defined in the drill guide, and through the work window for working on and/or fastening at the desired work location on one or more of the secured workpieces. In one embodiment, the passing step, described in connection with the exemplar method, is carried out using a line of sight, through the work window, to the desired work location, on one or more of the workpieces, where drilling is to occur.

Preferably, in the swiveling step, the work guide is free to rotate, relative to the u-shaped frame, to a plurality of positions. In this step, accordingly, the guide aperture is free to acquire a plurality of aligned locations that align with a plurality of work window locations defined within at least one of the work windows. Further, each of the plurality of aligned locations corresponds to one of the work window locations. In this configuration, the plurality of aligned locations and corresponding ones of the work window locations define a plurality of pathways, each of which allows a tool and/or an object to pass through the guide aperture and the work window to access or work on a desired work location on one or more workpieces. In light of this, the swiveling step may include selecting one of the plurality of positions of the work guide that defines a desired pathway through one of the aligned locations of the guide aperture and one of the work window locations of the work window to provide access to the desired work location on one or more workpieces.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly, and in a manner consistent with the scope of the invention, as set forth in the following claims.

What is claimed is:

1. A clamp for effecting alignment of one or more workpieces, said clamp comprising:
   a unitary u-shaped frame for clamping one or more workpieces and comprises a lower work window and an upper work window separated by a support member designed to provide access through said u-shaped frame to one or more workpieces;

a work guide rotatably coupled to said frame, disposed adjacent to the lower work window, and having defined therein a guide aperture;

wherein, in an operative state of said work guide, said work guide is free to rotate, relative to said u-shaped frame, to a plurality of positions, where said guide aperture is accordingly free to acquire a plurality of aligned locations that align with a plurality of work window locations defined within the lower work window, such that each of said plurality of aligned locations corresponds to one of said work window locations; and wherein, in said operative state of said work guide, said plurality of aligned locations and corresponding ones of said work window locations define a plurality of pathways, each of which is capable of allowing a tool to pass through said guide aperture and said work window to access or work on a desired location on one or more workpieces; and wherein at least one of said work windows provides a line of sight at one or more of said workpieces.

2. The clamp for effecting alignment of one or more of said work pieces of claim 1, wherein said unitary u-shaped frame defined by a bight portion, a first jaw portion and a second jaw portion wherein said first jaw portion includes, parallelly extending, a first clamping member and a second clamping member, wherein in an operative state of said u-shaped frame, said bight portion, said first clamping member and said second clamping member and said second jaw portion are disposed around one or more of said workpieces, and wherein said first clamping member and a second clamping member define there between said lower work window.

3. The clamp for effecting alignment of one or more of said work pieces of claim 2, further comprising:

a bight engagement mechanism including a bight shaft that is threaded to engage with a bight bore defined inside said bight portion of said u-shaped frame;

a jaw engagement mechanism including a jaw shaft that is threaded to engage with a jaw bore defined inside a distal end of said second jaw portion;

a bight pressure plate that is disposed at a distal end of said bight shaft, such that in an operative of said bight engagement mechanism, said bight pressure plate facilitates alignment of one or more of said workpieces in a back-and-forth direction; and a jaw pressure plate that is disposed at a distal end of said jaw shaft such that in an operative state of said jaw engagement mechanism, said jaw pressure plate facilitates alignment of one or more of workpieces in a side-to-side direction.

4. A clamp for effecting alignment of one or more workpieces, said clamp comprising:

a unitary u-shaped frame defined by a bight portion, a first jaw portion and a second jaw portion, wherein said first jaw portion includes, parallelly extending, first clamping member and a second clamping member, and in an operative state of said u-shaped frame, said bight portion, said first clamping member and said second clamping member and said second jaw portion are disposed around one or more workpieces;

wherein said first clamping member and said second clamping member are separated by a first jaw portion work window comprising a lower work window and an upper work window separated by a support member;

a reinforcement member coupled, at a distal end of said first jaw portion, to said first clamping member and said second clamping member; and a work guide having defined therein a guide aperture and rotatably coupled to said reinforcement member such that in, a plurality of rotated, work positions of said work guide, said guide aperture acquires a plurality of operating positions that are capable of providing a tool access to work on one or more desired locations on one or more of said workpieces through the lower work window.

5. The clamp for effecting alignment of one or more of said workpieces of claim 4, wherein said reinforcement member, coupled to both and extending between said first clamping member and said second clamping member of said first jaw portion, includes a horizontal flat edge and in a non-operational, stowed position of said work guide, a horizontal edge of said work guide aligns with said horizontal flat edge.

6. The clamp for effecting alignment of one or more of said workpieces of claim 5, wherein said first clamping member and said second clamping member are separated by said first jaw portion work window and in operational state of said work guide, said work guide is free to rotate, relative to said u-shaped frame, to a plurality of positions, where said guide aperture is accordingly free to acquire a plurality of aligned locations that align with said first jaw portion work window locations defined within said first jaw portion work window, respectively, such that each of said plurality of aligned locations corresponds to first jaw portion work window location; and wherein, in said operative state of said work guide, said plurality of aligned locations and corresponding ones of said first jaw portion locations define a plurality of pathways, each of which is capable of allowing a tool to pass through said guide aperture and said lower work window to access or work on a desired location on one or more workpieces.

7. The clamp for effecting alignment of one or more of said workpieces of claim 6, wherein said first jaw portion work window extends from or near a first proximate end, where said first jaw portion intersects said bight portion, to a location adjacent to said reinforcement member.

8. The clamp for effecting alignment of one or more of said workpieces of claim 4, wherein said second jaw portion further comprising a third clamping member parallelly extending with a fourth clamping member, and wherein at or near a second proximate end, where said second jaw portion intersects said bight portion, said third clamp member and said fourth claim member are separated to define a second jaw portion distance or a second jaw portion working window that is sufficiently large to provide, during an operational state of said u-shaped frame, a line of sight to and/or allow work to be carried out on one or more of said workpieces.

9. The clamp for effecting alignment of one or more of said workpieces of claim 8, wherein said third clamping member and said fourth clamping member parallelly extend from said bight portion to said second jaw portion and are arranged to define therebetween an extending space or an extending work window that extends from said bight portion to said second jaw portion and is sufficiently large to facilitate alignment of one or more of said multiple work pieces surrounded by said u-shaped frame, and wherein said extending space or said extending work window does not extend into a center region of said bight portion that is at or near location of said bight bore.

10. The clamp for effecting alignment of one or more of said workpieces of claim 4, further comprising:
- a bight engagement mechanism including a bight shaft that is threaded to engage with a bight bore defined inside said bight portion of said u-shaped frame;
- a jaw engagement mechanism including a jaw shaft that is threaded to engage with a jaw bore defined inside a distal end of said second jaw portion;
- a bight pressure plate that is disposed at a distal end of said bight shaft, such that in an operative of said bight engagement mechanism, said bight pressure plate facilitates alignment of one or more of said workpieces in a back-and-forth direction; and
- a jaw pressure plate that is disposed at a distal end of said jaw shaft such that in an operative state of said jaw engagement mechanism, said jaw pressure plate facilitates alignment of one or more of workpieces in a side-to-side direction.

11. The clamp for effecting alignment of one or more of said workpieces of claim 10, further comprising an in-turned projection disposed at a first distal end of said first jaw portion, wherein said jaw pressure plate is L-shaped, and wherein in said operative state of said jaw engagement mechanism, said L-shaped jaw pressure plate functions in conjunction with said in-turned projections, a contacting interior surface of said first jaw portion and said bight pressure plate to align said multiple workpieces in said back-and-forth direction and said side-to-side direction, wherein said contacting interior surface of said first jaw portion is designed to contact, during said operative state of said jaw engagement mechanism, one surface of said workpiece.

12. The clamp for effecting alignment of one or more of said workpieces of claim 10, wherein said second jaw portion, at a second distal end, does not include an in-turned projection and said L-shaped jaw pressure plate is different from said second jaw portion.

13. The clamp for effecting alignment of one or more of said workpieces of claim 10, wherein at least one of said bight engagement mechanism and said jaw engagement mechanism further comprising a T-shaped handle disposed at a terminating end of said bight engagement shaft and/or saw jaw engagement shaft.

14. A method for working on one or more of workpieces, said method comprising:
- obtaining a clamp comprising a unitary u-shaped frame having a work window comprising a lower work window and an upper work window separated by a support member and has installed thereon, and adjacent to said work window, a swiveling work guide, which has defined therein a guide aperture;
- securing, using said clamp, one or more workpieces, such that said u-shaped frame secures at least some surfaces of one or more of said multiple work pieces, to form one or more of said secured workpieces;
- swiveling said work guide into a desired position such that said guide aperture aligns with the lower work window and a desired work location, on one or more of said secured workpieces, where work is to be performed; and
- passing, in said desired position, a portion of a tool and/or an object through said guide aperture and said lower work window to access said desired work location on one or more of said secured workpieces.

15. The method for working on one or more of workpieces of claim 14, further comprising commencing work on said desired work location on one or more of said secured workpieces, wherein said commencing and/or said passing includes using a line of sight through said work window to reach said desired work location on one or more of said workpieces.

16. The method for working on one or more of workpieces of claim 13, further comprising aligning one or more of said secured workpieces, wherein said aligning is carried out prior to said swiveling said work guide, wherein said obtaining includes obtaining said u-shaped frame defined by a bight portion, a first jaw portion and a second jaw portion, wherein said first jaw portion includes, parallelly extending, a first clamping member and a second clamping member that are separated by said work window that is disposed adjacent to said swiveling work guide, wherein said securing is carried out using a bight engagement mechanism and a jaw engagement mechanism, wherein said bight engagement mechanism aligns said multiple workpieces in a back-and-forth direction and said jaw engagement mechanism aligns said multiple workpieces in a side-to-side direction, and wherein said aligning includes touching one or more of said secured workpieces using a second jaw portion work window defined on said second jaw portion and disposed adjacent to said jaw engagement mechanism.

17. The method for working on one or more of workpieces of claim 16, wherein said securing and said aligning is carried out substantially contemporaneously.

18. The method for working on one or more of workpieces of claim 14, wherein said passing includes passing a portion of a drill and/or a fastener through a drilling aperture, defined in said drill guide, and through said lower work window for working on and/or fastening at said desired work location on one or more of said secured workpieces, and wherein said passing is carried out using a line of sight, through said lower work window, to said desired work location, on one or more of said workpieces, where drilling is to occur.

19. The method for working on one or more of workpieces of claim 14, wherein in said swiveling, said work guide is free to rotate, relative to said u-shaped frame, to a plurality of positions, where said guide aperture is accordingly free to acquire a plurality of aligned locations that align with a plurality of work window locations defined within said lower work window, such that each of said plurality of aligned locations corresponds to one of said work window locations, and said plurality of aligned locations and corresponding ones of said work window locations define a plurality of pathways, each of which allows a tool and/or an object to pass through said guide aperture and said lower work window to access or work on a desired work location on one or more workpiece.

20. The method for effecting alignment of one or more of said workpieces of claim 19, wherein said swiveling includes selecting one of said plurality of positions of said work guide that defines a desired pathway through one of said aligned locations of said guide aperture and one of said work window locations of said lower work window to provide access to said desired work location on one or more workpiece.

* * * * *